(12) United States Patent
Kralicky

(10) Patent No.: US 8,147,321 B2
(45) Date of Patent: Apr. 3, 2012

(54) METHOD AND APPARATUS FOR ELECTRONIC RANDOM PRIZE DISTRIBUTION WITH FIXED PRIZE INVENTORY AND UNKNOWN PARTICIPANT COUNT

(75) Inventor: Joseph S Kralicky, North Kingstown, RI (US)

(73) Assignee: Rite-Solutions, Inc., Pawcatuck, CT (US)

( * ) Notice: Subject to any disclaimer, the term of this patent is extended or adjusted under 35 U.S.C. 154(b) by 1052 days.

(21) Appl. No.: 12/028,169

(22) Filed: Feb. 8, 2008

(65) Prior Publication Data

US 2008/0194318 A1 Aug. 14, 2008

Related U.S. Application Data

(60) Provisional application No. 60/889,076, filed on Feb. 9, 2007.

(51) Int. Cl.
*A63F 9/24* (2006.01)
*A63F 13/00* (2006.01)
*G06F 17/00* (2006.01)
*G06F 19/00* (2011.01)

(52) U.S. Cl. .............. 463/25; 463/17; 463/16; 463/42; 463/14; 463/28; 705/14; 273/292

(58) Field of Classification Search .................. None
See application file for complete search history.

(56) References Cited

U.S. PATENT DOCUMENTS

| | | | | |
|---|---|---|---|---|
| 5,231,568 A * | 7/1993 | Cohen et al. | .................... | 463/17 |
| 5,324,035 A * | 6/1994 | Morris et al. | .................... | 463/42 |
| 6,419,583 B1 * | 7/2002 | Crumby et al. | ................. | 463/42 |
| 7,749,078 B2 * | 7/2010 | Vlazny et al. | ................... | 463/28 |
| 2003/0078835 A1 * | 4/2003 | Pluchinske | ..................... | 705/14 |
| 2004/0242302 A1 * | 12/2004 | Baerlocher | ..................... | 463/16 |
| 2005/0040601 A1 * | 2/2005 | Yoseloff et al. | ................ | 273/292 |
| 2006/0084496 A1 * | 4/2006 | Jaffe et al. | ........................ | 463/20 |
| 2006/0258432 A1 * | 11/2006 | Packer et al. | ................... | 463/16 |
| 2007/0066389 A1 * | 3/2007 | Kojima | ........................... | 463/31 |
| 2009/0247260 A1 * | 10/2009 | Goto et al. | ...................... | 463/19 |
| 2010/0022289 A1 * | 1/2010 | Menicou | ......................... | 463/14 |
| 2010/0197379 A1 * | 8/2010 | Cannon | .......................... | 463/21 |

* cited by examiner

*Primary Examiner* — Paul A D'Agostino
(74) *Attorney, Agent, or Firm* — Ryan, Mason & Lewis, LLP

(57) ABSTRACT

A probability of winning at least one of a plurality of prizes for a contest is dynamically adjusted, given a fixed prize inventory and an a priori unknown number of participants. A variable probability is determined by approximately dividing a current number of participants in the contest by a current number of prizes awarded. The variable probability is dynamically adjusted based on a variable probability multiplier, that is obtained by dividing a current number of winners in a predefined time interval by a remaining number of prizes in the predefined time interval. A prize can be awarded based on the adjusted variable probability.

20 Claims, 2 Drawing Sheets

FIG. 2

ELECTRONIC RANDOM PRIZE DISTRIBUTION PROCESS 200

210 { if (NumPrizesWon = 0)
       VariableOdds = InitialOdds

220 { Else If (NumPrizesWon = TotalNumPrizes)
       Exit (Loser)

230 { Else
       VariableOdds = TotalParticipants / NumberPrizesWon

240 { NumberWinnersPerMinute = NumberPrizesWon / ElapsedPromotionMinutes

250 { RemainingPrizesPerMinute = (TotalNumberPrizes - NumberPrizesWon) /
                                 (TotalPromotionMinutes - ElapsedPromotionMinutes)

260 { VariableOddsMultiplier = NumberWinnersPerMinute /
       RemainingPrizesPerMinutes;

270 { VariableOdds = VariableOdds * VariableOddsMultiplier

METHOD AND APPARATUS FOR ELECTRONIC RANDOM PRIZE DISTRIBUTION WITH FIXED PRIZE INVENTORY AND UNKNOWN PARTICIPANT COUNT

CROSS REFERENCE TO RELATED APPLICATIONS

This application claims the benefit of U.S. Provisional Application No. 60/889,076 filed Feb. 9, 2007, incorporated by reference herein.

FIELD OF THE INVENTION

The present invention relates generally to techniques for distributing promotional prizes, and more particularly, to techniques for smoothing the distribution of promotional prizes over the course of a promotion.

BACKGROUND OF THE INVENTION

Historically, a contestant was able to enter a promotional contest provided they had an appropriate entry form or game card, such as a scratch card. Generally, a limited number of the enrollment forms or game cards were issued, based on the estimated participation and contestants could enter the promotional contest "while supplies lasted." In this manner, the odds of winning a prize could be controlled over the course of the promotion.

Increasingly, electronic promotions are being offered, where a contestant enters an electronic promotional contest electronically. With electronic promotions, contestants may enter, for example, by swiping an electronic card, placing a telephone call to a specified number, sending an electronic mail or text message to a specified address, or by having an RFID tag in the vicinity of an appropriate reader. In addition, a contestant may be automatically entered in an electronic promotional contest by having a transaction history that satisfies a predefined threshold. For example, a customer may be automatically entered in a promotional contest when a particular dollar value (such as a minimum purchase amount) or usage threshold (such as a minimum number of calls or messages in a predefined interval) is exceeded.

Typically, such promotional contests have a fixed number of prizes and are run for a specified duration. The number of participants that will enter a given promotional contest, however, is typically not known and hard to predict in advance.

The provider of the promotional contest does not want to distribute more than the allotted number of prizes in a prize inventory for an electronic promotion. Thus, given a fixed number of prizes and an unknown number of participants for a promotional contest, there exists a need for methods and apparatus for dynamically adjusting the odds of winning over time to smooth the number of prizes awarded, based on the actual participation. The prizes should be distributed in a random fashion, and distributed approximately equally over the course of the promotion. Ideally, all prizes will be given away.

SUMMARY OF THE INVENTION

Generally, methods and apparatus are provided for electronic random prize distribution with a fixed prize inventory and an unknown number of participants for a promotional contest. According to one aspect of the invention, methods and apparatus are provided for dynamically adjusting a probability of winning at least one of a plurality of prizes for a contest, given a fixed prize inventory and an a priori unknown number of participants. A variable probability of winning at least one of the prizes is determined by approximately dividing a current number of participants in the contest by a current number of prizes awarded. The variable probability is then dynamically adjusted based on a variable probability multiplier, wherein the variable probability multiplier is obtained by dividing a current number of winners in a predefined time interval by a remaining number of prizes in the predefined time interval, wherein the current number of winners in the predefined time interval is substantially equal to the current number of prizes awarded divided by an elapsed number of the predefined time intervals in the contest, and wherein the remaining number of prizes in the predefined time interval is substantially equal to the fixed prize inventory minus the current number of prizes awarded divided by the total number of the predefined time intervals in the contest minus the elapsed number of the predefined time intervals in the contest. One or more of the at least one of the plurality of prizes ate then awarded based on the adjusted variable probability.

Generally, the probability of winning at least one of the prizes is approximately equal to one chance in the value of the adjusted variable probability. The adjusted variable probability can be obtained, for example, by multiplying the variable probability by the variable probability multiplier.

If the number of prizes that have been awarded substantially equals the total number of prizes available for the promotion, the method can be terminated. The method can optionally start with an initial probability of winning at least one of the prizes. The predefined time interval can be, for example, one minute.

A more complete understanding of the present invention, as well as further features and advantages of the present invention, will be obtained by reference to the following detailed description and drawings.

BRIEF DESCRIPTION OF THE DRAWINGS

FIG. 2 provides pseudo-code for an exemplary implementation of the electronic random prize distribution process of FIG. 1.

DETAILED DESCRIPTION

Figure 1:
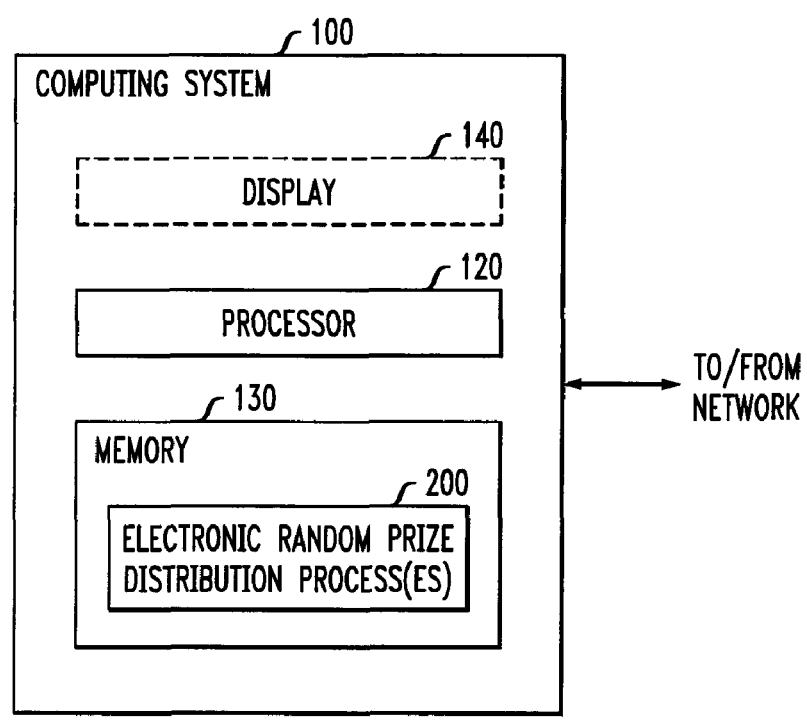
FIG. 1 is a block diagram of a computing system that can implement the processes of the present invention.

The present invention provides methods and apparatus for electronic random prize distribution with a fixed prize inventory and an unknown number of participants for a promotional contest. According to one aspect of the invention, methods and apparatus are provided for dynamically adjusting the odds of winning a promotional prize over time to smooth the number of prizes awarded, based on the actual participation. The present invention can distribute prizes in a random fashion, and approximately equally over the course of the promotion.

FIG. 1 is a block diagram of a computing system 100 that can implement the processes of the present invention. As shown in FIG. 1, memory 130 configures the processor 120 to implement the methods, steps, and functions disclosed herein (collectively, shown as electronic random prize distribution process 200 in FIG. 1). The electronic random prize distribution process 200 is discussed further below in conjunction with FIG. 2.

The memory 130 could be distributed or local and the processor 120 could be distributed or singular. The memory 130 could be implemented as an electrical, magnetic or optical memory, or any combination of these or other types of storage devices. It should be noted that each distributed processor that makes up processor 120 generally contains its own addressable memory space. It should also be noted that some or all of computer system 100 can be incorporated into a personal computer, laptop computer, handheld computing device, application-specific circuit, general-use integrated circuit or electronic gaming machine, such as a slot machine The computing system 100 optionally includes a display 140 or another output mechanism.

FIG. 2 provides pseudo-code for an exemplary implementation of the electronic random prize distribution process 200. Generally, the electronic random prize distribution process 200 determines an appropriate prize distribution for a fixed prize inventory and an unknown number of participants for a promotional contest. As discussed hereinafter, the electronic random prize distribution process 200 dynamically adjusts the odds of winning a promotional prize over time, to smooth the number of prizes awarded, based on the actual participation.

In the exemplary embodiment of the electronic random prize distribution process 200 shown in FIG. 2, the odds of winning a prize over the course of the promotion changes based on the prize distribution history, number of remaining prizes, elapsed promotion time, and remaining promotion time. It is noted that there must be an initial "odds" selected for the first prize only. The variable, initial odds, is an integer greater than zero, such as 1:n where n is the initial odds.

As shown in FIG. 2, the electronic random prize distribution process 200 initially determines during section 210 whether any prizes have been awarded yet in accordance with the promotion. If no prizes have been awarded yet, the variable, VariableOdds, is set to the initial odds value.

If some prizes have been awarded, the electronic random prize distribution process 200 determines during section 220 whether the number of prizes that have been won so far equals the total number of prizes available for the promotion. If all the prizes available for the promotion have been won, then the promotion is finished and the electronic random prize distribution process 200 may exit.

If there are additional prizes to be awarded, the variable, VariableOdds, is set during line 230 to the value of the TotalParticipants divided by the NumberPrizesWon. In addition, during line 240, the variable, NumberWinnersPerMinute, is set to the NumberPrizesWon divided by the ElapsedPromotionMinutes. The RemainingPrizesPerMinute is set during step 250 to the TotalNumberPrizes minus the NumberPrizesWon divided by the TotalPromotionMinutes minus the ElapsedPromotionMinutes.

A variable, VariableOddsMultiplier, is determined during step 260 by dividing the NumberWinnersPerMinute by the RemainingPrizesPerMinute. Finally, the variable, VariableOdds, is set during step 270 to the prior value of VariableOdds multiplied by the VariableOddsMultiplier (determined in the previous step). Thus, the electronic random prize distribution process 200 establishes that the odds of winning a prize are 1 chance in the value of the variable, VariableOdds.

While the electronic random prize distribution process 200 employs a measurement interval equal to a minute, other time intervals can be selected, as would be apparent to a person of ordinary skill in the art. Generally, given a fixed number of prizes and an unknown number of participants for a promotional contest, the electronic random prize distribution process 200 dynamically adjusts the odds of winning over time to smooth the number of prizes awarded, based on the actual participation. For example, if the provider of the promotional contest wishes to award two prizes per hour, and in a given hour there are three winners, the odds of winning for the next hour will be higher, making it harder to win (fewer prizes) in the next hour.

While FIG. 2 shows an exemplary sequence of steps, it is also an embodiment of the present invention that the sequence may be varied. Various permutations of the algorithm are contemplated as alternate embodiments of the invention. While exemplary embodiments of the present invention have been described with respect to the digital domain as processing steps in a software program, as would be apparent to one skilled in the art, various functions may be implemented as processing steps in a software program, in hardware by digital logic blocks, circuit elements or state machines, or in combination of both software and hardware. Such software may be employed in, for example, a digital signal processor, microcontroller, or general-purpose computer. Such hardware and software may be embodied within circuits implemented within an integrated circuit.

Thus, the functions of the present invention can be embodied in the form of methods and apparatuses fox practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be lead from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

I claim:

1. A method for dynamically adjusting a probability of winning at least one of a plurality of prizes for a contest, given a fixed prize inventory and an a priori unknown number of participants, comprising:

determining a variable probability of winning at least one of said prizes by approximately dividing a current number of participants in said contest by a current number of prizes awarded;

dynamically adjusting said variable probability based on a variable probability multiplier, wherein said variable probability multiplier is obtained by dividing a current number of winners in a predefined time interval by a remaining number of prizes in said predefined time interval, wherein said current number of winners in said predefined time interval is substantially equal to said current number of prizes awarded divided by an elapsed number of said predefined time intervals in said contest, and wherein said remaining number of prizes in said predefined time interval is substantially equal to the fixed prize inventory minus said current number of prizes awarded divided by the total number of said predefined time intervals in said contest minus said elapsed number of said predefined time intervals in said contest; and awarding one or more of said at least one of said plurality of prizes based on said adjusted variable probability, wherein said determining, dynamically adjusting and awarding steps are performed by a hardware device.

2. The method of claim 1, wherein said probability of winning at least one of said prizes is approximately equal to one chance in the value of the adjusted variable probability.

3. The method of claim 1, further comprising the step of determining by said hardware device whether the number of prizes that have been awarded equals the total number of prizes available for the promotion.

4. The method of claim 1, further comprising the step of obtaining an initial probability of winning at least one of said prizes.

5. The method of claim 1, wherein said predefined time interval is one minute.

6. The method of claim 1, wherein said adjusted variable probability is obtained by multiplying said variable probability by said variable probability multiplier.

7. The method of claim 3, further comprising the step of terminating said method if substantially all of the prizes available for the promotion have been awarded.

8. An apparatus for dynamically adjusting a probability of winning at least one of a plurality of prizes for a contest, given a fixed prize inventory and an a priori unknown number of participants, the apparatus comprising:

a memory; and at least one processor, coupled to the memory, operative to:

determine a variable probability of winning at least one of said prizes by approximately dividing a current number of participants in said contest by a current number of prizes awarded;

dynamically adjust said variable probability based on a variable probability multiplier, wherein said variable probability multiplier is obtained by dividing a current number of winners in a predefined time interval by a remaining number of prizes in said predefined time interval, wherein said current number of winners in said predefined time interval is substantially equal to said current number of prizes awarded divided by an elapsed number of said predefined time intervals in said contest, and wherein said remaining number of prizes in said predefined time interval is substantially equal to the fixed prize inventory minus said current number of prizes awarded divided by the total number of said predefined time intervals in said contest minus said elapsed number of said predefined time intervals in said contest; and award one or more of said at least one of said plurality of prizes based on said adjusted variable probability.

9. The apparatus of claim 8, wherein said probability of winning at least one of said prizes is approximately equal to one chance in the value of the adjusted variable probability.

10. The apparatus of claim 8, wherein said processor is further configured to determine whether the number of prizes that have been awarded equals the total number of prizes available for the promotion.

11. The apparatus of claim 8, wherein said processor is further configured to obtain an initial probability of winning at least one of said prizes.

12. The apparatus of claim 8, wherein said predefined time interval is one minute.

13. The apparatus of claim 10, wherein said processor is further configured to terminate said apparatus if substantially all of the prizes available for the promotion have been awarded.

14. The apparatus of claim 9, wherein said adjusted variable probability is obtained by multiplying said variable probability by said variable probability multiplier.

15. An article of manufacture for dynamically adjusting a probability of winning at least one of a plurality of prizes for a contest, given a fixed prize inventory and an a priori unknown number of participants, comprising a tangible computer readable recordable medium containing one or more programs which when executed implement the steps of:

determining a variable probability of winning at least one of said prizes by approximately dividing a current number of participants in said contest by a current number of prizes awarded;

dynamically adjusting said variable probability based on a variable probability multiplier, wherein said variable probability multiplier is obtained by dividing a current number of winners in a predefined time interval by a remaining number of prizes in said predefined time interval, wherein said current number of winners in said predefined time interval is substantially equal to said current number of prizes awarded divided by an elapsed number of said predefined time intervals in said contest, and wherein said remaining number of prizes in said predefined time interval is substantially equal to the fixed prize inventory minus said current number of prizes awarded divided by the total number of said predefined time intervals in said contest minus said elapsed number of said predefined time intervals in said contest; and awarding one or more of said at least one of said plurality of prizes based on said adjusted variable probability.

16. The article of manufacture of claim 15, wherein said probability of winning at least one of said prizes is approximately equal to one chance in the value of the adjusted variable probability.

17. The article of manufacture of claim 15, further comprising the step of determining whether the number of prizes that have been awarded equals the total number of prizes available for the promotion.

18. The article of manufacture of claim 15, further comprising the step of obtaining an initial probability of winning at least one of said prizes.

19. The article of manufacture of claim 15, wherein said adjusted variable probability is obtained by multiplying said variable probability by said variable probability multiplier.

20. The article of manufacture of claim 17, further comprising the step of terminating said article of manufacture if substantially all of the prizes available for the promotion have been awarded.

* * * * *